US008353626B2

(12) United States Patent
Rogers et al.

(10) Patent No.: US 8,353,626 B2
(45) Date of Patent: Jan. 15, 2013

(54) EMISSIVITY INDEPENDENT NON-CONTACT HIGH TEMPERATURE MEASUREMENT SYSTEM AND METHOD

(75) Inventors: Mark D. Rogers, Ballwin, MO (US); Loyal B. Shawgo, O'Fallon, MO (US)

(73) Assignee: The Boeing Company, Chicago, IL (US)

( * ) Notice: Subject to any disclaimer, the term of this patent is extended or adjusted under 35 U.S.C. 154(b) by 158 days.

(21) Appl. No.: 13/012,434

(22) Filed: Jan. 24, 2011

(65) Prior Publication Data
US 2011/0119019 A1  May 19, 2011

Related U.S. Application Data

(62) Division of application No. 12/032,893, filed on Feb. 18, 2008, now Pat. No. 7,891,866.

(51) Int. Cl.
G01J 5/00 (2006.01)
G01K 1/16 (2006.01)
(52) U.S. Cl. ........ 374/130; 374/120; 374/124; 374/141; 702/134; 356/474
(58) Field of Classification Search .................. 374/120, 374/130, 124, 141; 702/134; 356/474
See application file for complete search history.

(56) References Cited

U.S. PATENT DOCUMENTS

| 4,077,719 | A | * | 3/1978 | Barrett et al. | 356/301 |
|---|---|---|---|---|---|
| 4,173,442 | A | * | 11/1979 | Snyder | 356/454 |
| 4,572,669 | A | * | 2/1986 | James et al. | 356/480 |
| 5,272,340 | A | * | 12/1993 | Anbar | 250/332 |
| 5,561,523 | A | | 10/1996 | Blomberg et al. | |
| 7,030,991 | B1 | * | 4/2006 | Kampe et al. | 356/454 |
| 7,038,782 | B2 | * | 5/2006 | Hedin et al. | 356/454 |
| 7,744,274 | B1 | | 6/2010 | Grek et al. | |
| 7,891,866 | B2 | | 2/2011 | Rogers et al. | |
| 2002/0146056 | A1 | | 10/2002 | Yano et al. | |
| 2008/0285601 | A1 | * | 11/2008 | Sherrer et al. | 372/19 |
| 2009/0296776 | A1 | | 12/2009 | Riza et al. | |

OTHER PUBLICATIONS

Nogueira, Felipe G.; Felps, Daniel; and Gutierrez-Osuna, Ricardo. "Development of an Infrared Absorption Spectroscope Based on Linear Variable Filters", IEEE Sensors Journal, vol. 7, No. 8, Aug. 2007, pp. 1183-1190.

Madura, H.; Kastek, M.; Piatkowski, T.; "Automatic Compensation of Emissivity in Three-Wavelength Pyrometers", Institute of Optoelectronics, Military University of Technology, Infrared Physics & Technology 51 (2007), pp. 1-8.

(Continued)

Primary Examiner — Mirellys Jagan
(74) Attorney, Agent, or Firm — Harness, Dickey & Pierce, P.L.C.

(57) ABSTRACT

An apparatus for determining a temperature of an object without contacting the object. An etalon filter may be used to receive spectral radiation of the object over a plurality of wavelengths and to generate a spectral output signal. A linear array detector may be used that is responsive to the spectral output signal from the etalon filter and adapted to generate an output indicative of the spectral radiation at each of one of the plurality of wavelengths. An actuator may be used that controls movement of one element of the etalon filter to assist in generating the output. A processor may be used which is responsive to the output of the linear array detector and which analyzes a known characteristic of a black body at a plurality of test temperatures, against the output of the linear array detector, to determine a specific temperature of the object.

20 Claims, 4 Drawing Sheets

OTHER PUBLICATIONS

Byer, R. L. and Roundy, C. B. "Pyroelectric Coefficient Direct Measurement Technique and Application to a NSEC Response Time Detector", Microwave Laboratory, Stanford University, Stanford, California, IEEE Trans. Sonics & Ultrasounds, 1972, SU-19, pp. 333-338.

* cited by examiner

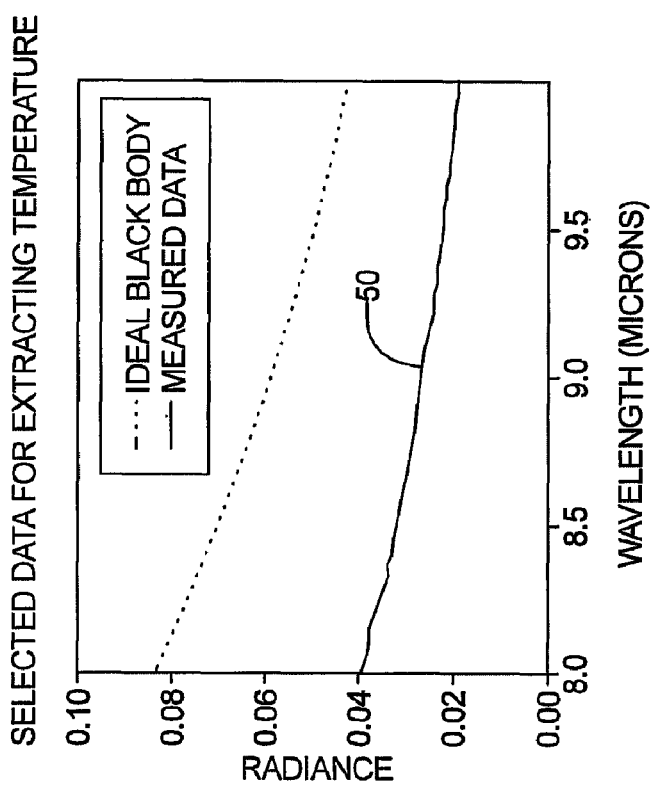
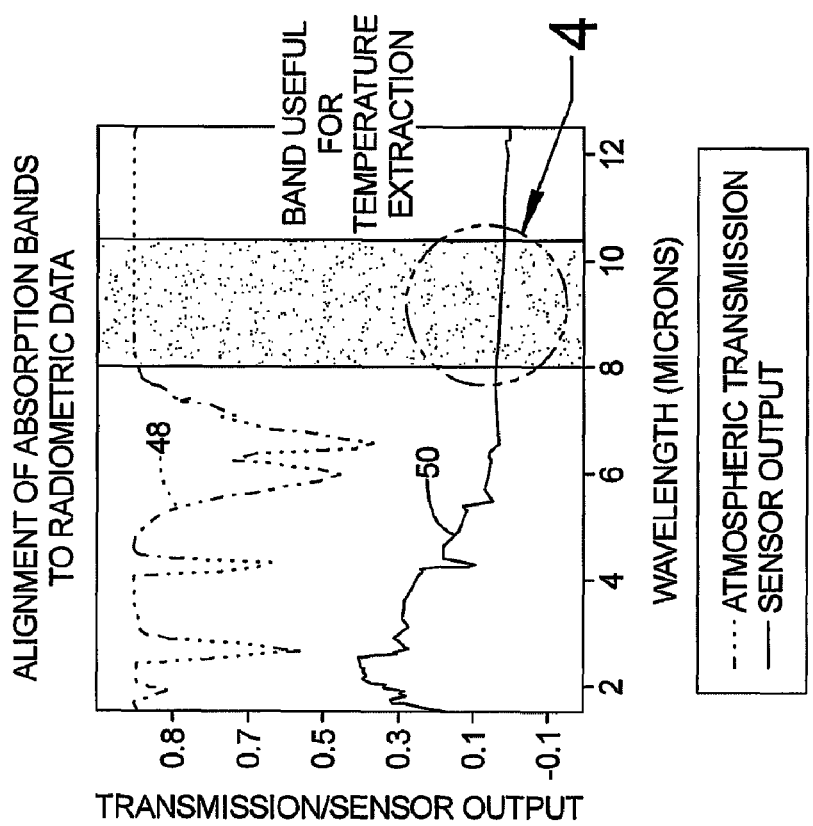
FIG 4
FIG 3

EMISSIVITY INDEPENDENT NON-CONTACT HIGH TEMPERATURE MEASUREMENT SYSTEM AND METHOD

CROSS-REFERENCE TO RELATED APPLICATIONS

The present application is related in general subject matter to U.S. patent application Ser. No. 11/382,523, filed May 10, 2006, entitled "System and Architecture for Automatic Image Registration," assigned to The Boeing Company, and hereby incorporated by reference in its entirety into the present application (now abandoned). The present application is further related in general subject matter to pending commonly assigned U.S. patent application Ser. No. 11/554,722, filed Oct. 31, 2006, entitled "Method and System for Image Registration Quality Confirmation and Improvement," hereby incorporated by reference in its entirety into the present application (now U.S. Pat. No. 8,055,100).

FIELD

The present disclosure relates to temperature measurement systems and methods, and more particularly to a spectral radiometer system and method that is able to determine a temperature of a high temperature object without making physical contact with the object.

BACKGROUND

The statements in this section merely provide background information related to the present disclosure and may not constitute prior art.

Various system and methods have been employed where the need has existed to determine the temperature of object. Such systems and methods have typically involved the use of optical pyrometers, laser assisted pyrometers, multi-spectral pyrometers and thermocouples. In the case of thermocouples, there has been a need to make physical contact with a portion of the object whose temperature is being sensed. This is less desirable since it can affect the measurement by way of the physical contact. Pyrometers, on the other hand, do not involve physical contact of the sensor with the object whose temperature is being sensed. However multi-spectral pyrometers tend to be complex in construction.

SUMMARY

In one aspect the present disclosure relates to an apparatus for determining a temperature of an object without contacting the object. The apparatus may comprise an etalon filter for receiving spectral radiation of the object over a plurality of wavelengths and generating a spectral output signal. A linear array detector may be used that is responsive to the spectral output signal from the etalon filter and adapted to generate an output indicative of the spectral radiation at each of one of the plurality of wavelengths. An actuator may be used for controlling movement of one element of the etalon filter to sweep the spectral output signal across the linear array detector, to assist in generating the output. A processor may be used that is responsive to the output of the linear array detector. The processor may be adapted to analyze a known characteristic of a black body at a plurality of test temperatures, against the output of said linear array detector, to determine a specific temperature of the object.

In another aspect the present disclosure relates to an apparatus for determining a temperature of an object without contacting the object. The apparatus may comprise an etalon filter for receiving spectral radiation of the object over a plurality of wavelengths and generating a spectral output signal. A linear array detector may be used which is responsive to the spectral output signal from the etalon filter and adapted to generate an output indicative of the spectral radiation at each of one of the plurality of wavelengths. An actuator may be used for controlling movement of one element of the etalon filter to assist in generating the output. A processor may be used which is responsive to the output of the linear array detector and adapted to analyze a known characteristic of a black body at a plurality of test temperatures, against the output of said linear array detector, to determine a specific temperature of the object. The processor may include an algorithm that enables the processor to determine a set of ratios of the output relative to the characteristic of the black body, for each one of the test temperatures.

In still another aspect the present disclosure relates to an apparatus for determining a temperature of an object without contacting the object. The apparatus may include an etalon filter for receiving spectral radiation of the object over a plurality of wavelengths and generating a spectral output signal. A linear array detector may be used which is responsive to the spectral output signal from the etalon filter and adapted to generate an output indicative of the spectral radiation at each of one of the plurality of wavelengths. An actuator may be used for controlling movement of one element of the etalon filter to assist in generating the output. A processor may be used which is responsive to the output of the linear array detector and adapted to analyze a known characteristic of a black body at a plurality of test temperatures, against the output of the linear array detector, to determine a specific temperature of the object. The processor may include an algorithm that enables the processor to determine a set of ratios of the output relative to the characteristic of the black body, for each one of the test temperatures. The processor may be adapted to execute the algorithm to determine a standard deviation for each set of the ratios. The processor may also be adapted to use the standard deviations and the characteristic of the black body at each of the test temperatures to determine an actual temperature of the black body.

Further areas of applicability will become apparent from the description provided herein. It should be understood that the description and specific examples are intended for purposes of illustration only and are not intended to limit the scope of the present disclosure.

BRIEF DESCRIPTION OF THE DRAWINGS

The drawings described herein are for illustration purposes only and are not intended to limit the scope of the present disclosure in any way.

FIG. 3 is a graph showing an exemplary spectral radiation input signal and an exemplary output from the etalon filter of FIG. 2;

FIG. 4 is an enlarged view of a portion of the output waveform shown in FIG. 3 as well as a characteristic (in this example radiance) of an ideal black body;

DETAILED DESCRIPTION

The following description is merely exemplary in nature and is not intended to limit the present disclosure, application, or uses.

Figure 1:
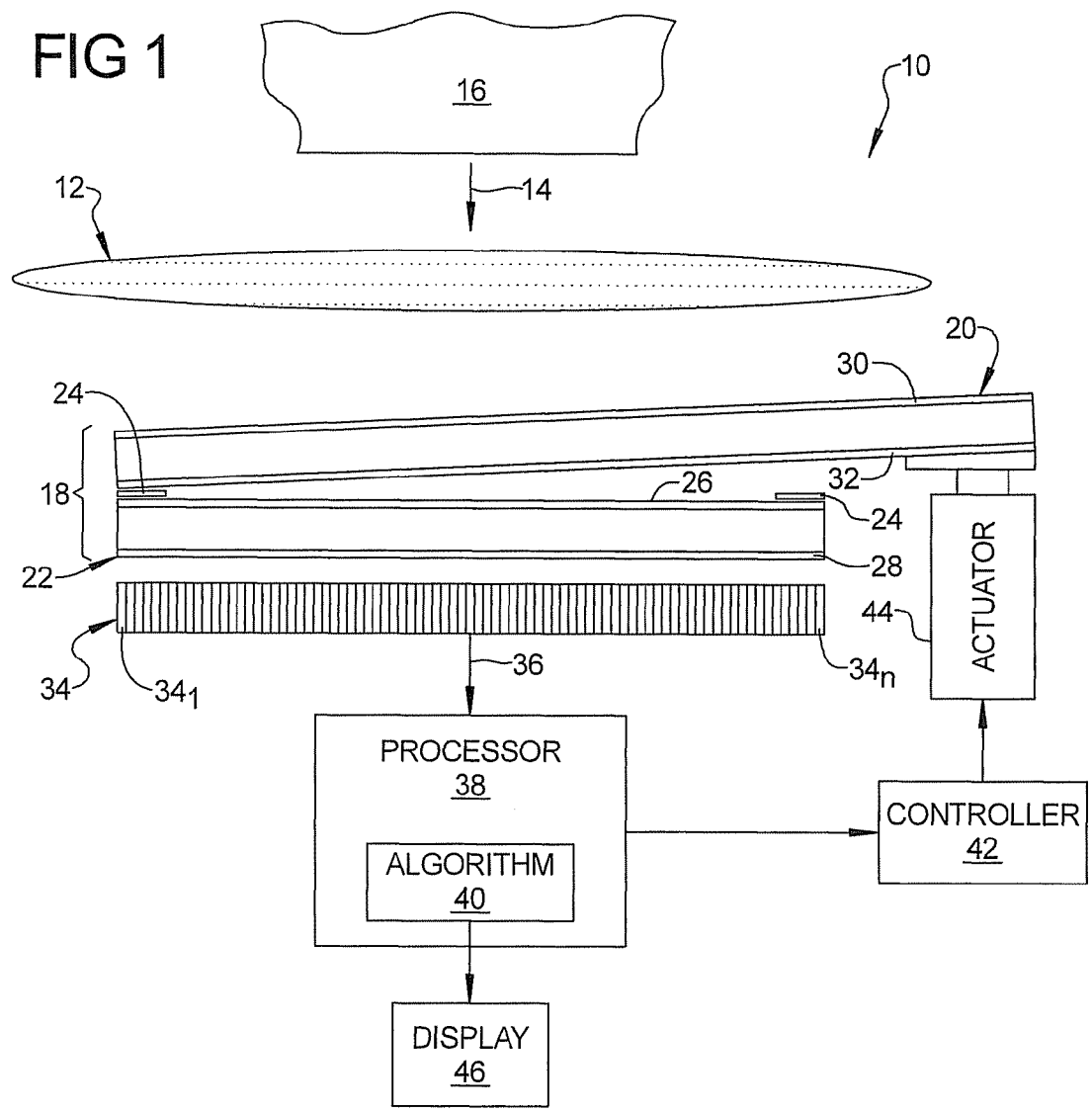
FIG. 1 is a high level block diagram of one embodiment of an apparatus in accordance with the present disclosure for determining the temperature of an object without physically contacting the object.

Referring to FIG. 1, there is shown an apparatus 10 in accordance with one embodiment of the present disclosure. The apparatus 10 includes a lens 12 that receives spectral radiation 14 from an object 16. The apparatus 10 is not in contact with the object 16 whose temperature is being measured. The lens 12 may be an anamorphic lens. The spectral radiation 14 is focused by the lens 12 onto an etalon filter, in this example a Fabry-Perot filter combined with a linear variable filter 18. For convenience, the filter 18 will be referred to simply as the "etalon filter" 18.

The etalon filter 18 includes a first substrate 20 and a second substrate 22 that is spaced apart from the first substrate. Spacer elements 24 may be positioned between the substrates 20 and 22 to maintain a minimum spacing, and thus limit to set the minimum wavelength that may be transmitted by the etalon filter 18. The second substrate 22 may include a broad band reflective coating 26 on a first thereof that faces the lens 12. A second (i.e., opposite) surface of the second substrate may include a linear variable transmitting filter 28. The wavelength of the linear variable transmitting filter 28 may be set to any desired range for a specific application.

The first substrate 20 may include a broad band anti-reflective coating 30 on a first surface thereof that faces the lens 12, and a broad band reflective coating 32 on a second (i.e., opposing) surface thereof. Substrates 20 and 22 may be comprised of a material that transmits the set of wavelengths that are received at the linear array detector 34. Examples of suitable materials are Germanium, Zinc, Selenide, and Sapphire. Each may have a thickness typically within a range of about 0.125_inch-0.25 inch (3.175 mm-6.35 mm).

A linear array detector 34 is disposed adjacent the etalon filter 18 to receive spectral information being output from the etalon filter. The detector 34 includes a plurality, of independent detector segments $34_1$-$34_n$ that each are tuned to a specific wavelength. Each detector segment $34_a$-$34_n$ generates an electrical output signal in relation to the energy of the spectral radiation that impinges it. The detector 34 output signals are denoted in simplified form by reference number 36. In one specific form the linear array detector 34 forms a linear array of pyroelectric type sensors.

The electrical output signals 36 from the detector 34 are fed to a processor 38 that is adapted to execute an algorithm 40. The processor 38 generates output signals that may be used by a controller 42 to control an actuator 44, such that operation of the actuator 44 is synchronized to the output of the linear array detector 34. When the processor 38 receives a synchronizing pulse from the linear array detector 34 within the output signals 36, it transmits the signal 41 to the controller 42. The controller 42 applies a swept voltage, linear in time, to the actuator 44 which responds by changing the angle that the substrate 20 makes with respect to substrate 22. The angle is also changed in a linear fashion with time, after which the controller 42 resets the actuator 44 to its initial position, thereby resetting the substrate 20 to its initial angle of zero degrees. The synchronization of the actuator 44 comes about from signals that are internally generated by the array detector 34 that are sequentially sent to the processor 38 at a rate of preferably about ten times per second or greater. Thus, movement of the first substrate 20 effectively causes the focused spectral radiation from the lens 12 to be "swept" across the surface of the detector 34 that faces the etalon filter 18.

The algorithm 40 is used by the processor 38 to analyze known, predetermined characteristics of a black body, at various test temperatures, in relation to the spectral data provided by the linear array detector 34. This will be explained in greater detail in the following paragraphs, but in brief the algorithm 40 operates to obtain a set of ratios at each one of the test temperatures, and to generate an array of standard deviations therefrom. A minimum one of the standard deviations is identified. The minimum standard deviation identifies the set of ratios that varied the least from its associated test temperature. From this information the actual temperature of the object 16 can be determined. The actual temperature may be then be displayed on a display device 46 such as an LCD display, a CRT display, or otherwise printed using a printer (not shown) or stored using a memory device (not shown).

Figure 2:
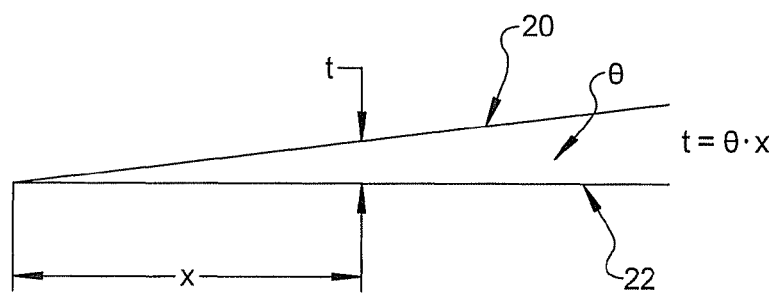
FIG. 2 is a prior art diagram that helps to explain the nature of the output of an etalon filter.

Referring briefly to FIG. 2, background information on the characteristics of the linear variable transmitting filter 28 will now be discussed. One may assume that for a given wavelength, the transmission from the filter 28 will be a Gaussian shape, with σ=0.1 micron.

Also assume center or average wavelength, λ, is proportional to the "x" position. Thus, the output of the linear variable transmitting filter 28 may be expressed as:

$$T_{LVF}(x) = e^{\frac{-(x-\lambda)^2}{2\sigma^2}}$$

The transmission of the etalon filter 18 "T" also varies across the aperture of the first (i.e., tilted) substrate 20 as a function of tilt angle, wavelength, I, and Reflectance, R. Thus, the transmission function for the etalon filter 18 with a spacing of t is, for normal incidence*, $$T_{etalon} = \frac{1}{1 + F \cdot \sin^2\left(\frac{\delta}{2}\right)}$$

where $$F = \frac{4R}{(1-R)^2} \text{ and } \delta = \frac{4 \cdot t}{\lambda}$$

The spacing "t" used in the transmission function varies across the length of the etalon plate "x" and depends upon the tilt or wedge angle "q" for small angles as represented in FIG. 2. Higher orders of etalon transmission, for example where λ desired=10 micron, and λ=5 micron is also transmitted, are rejected by the linear variable filter transmission function.

For a given tilt angle "θ", the total transmission of both filter elements (i.e., substrates 20 and 22) is given as a function of x and λ by:

$$T_{total}(x, \lambda) = e^{\frac{-(x-\lambda)}{2\sigma^2}} \cdot \left[1 + F \cdot \sin^2\left(\frac{4 \cdot \theta \cdot x}{\lambda}\right)\right]^{-1}$$

In general, the algorithm 40 may be used to find the minimum difference between a set of test functions and the measured data (represented by output 36) obtained from the linear array detector 34. The main assumption about the data is that it has been acquired from a source with constant emissivity (a gray body). For an ideal gray body source, the ratio of an ideal black body ($I_{BB}$) to the measured gray body characteristic ($I_{data}$), at the same temperature, will be a constant:

$$\frac{I_{BB}(\lambda)|_{T1}}{I_{data}(\lambda)|_{T2}} = R(\lambda) = \text{constant when } T1 = T2$$

where T1=temperature 1=T2=temperature 2.

In the case where T1=T2, R ($\lambda$)=constant=1/emissivity for all $\lambda$. In this case, the standard deviation taken over the set of ratios taken across the measurement band is zero, since $\sigma$ (the constant)=0. For cases where T1 and T2 are different, the standard deviation is always greater than zero.

The algorithm 40 compares the data set (i.e., collection of spectral output signals from the detector 34) to the black body characteristics at incremental test temperatures and computes an array of standard deviations from the resulting curves. The minimum standard deviation of this array occurs at the test temperature closest to that corresponding to the spectral output data 36.

Absorption mechanisms such as atmospheric $C_{O2}$ and water vapor, however, can cause the resulting spectral data set to deviate considerably from the ideal gray body characteristic. This is illustrated in FIG. 3, where atmospheric transmission 48 is represented in dashed lines and represents the spectral signal 14 from the object 16, and the solid line graph 50 represents the output of the linear array detector 34. To circumvent this drawback, only data in wavelength bands outside the known absorption regions need be considered to get accurate results. In this example, the wavelength bands of graph 50 indicated by circled area 4 may be used, because at these wavelengths the portions of the graphs 48 and 50 are substantially unaffected by the atmospheric absorption. Because of this, an accurate measurement may be had by using only a portion of the available data set, if absorption or other perturbing processes are present. FIG. 4 illustrates the circled portion of graph 50 from FIG. 3, together with the radiance of an ideal black body at various wavelengths over the wavelength spectrum between from 8 microns to about 10.2 microns. These curves are substantially unaffected by atmospheric absorption, meaning that no significant ambient influences will affect the computation of the temperature of the object 16 in this wavelength region of interest.

Figure 5:
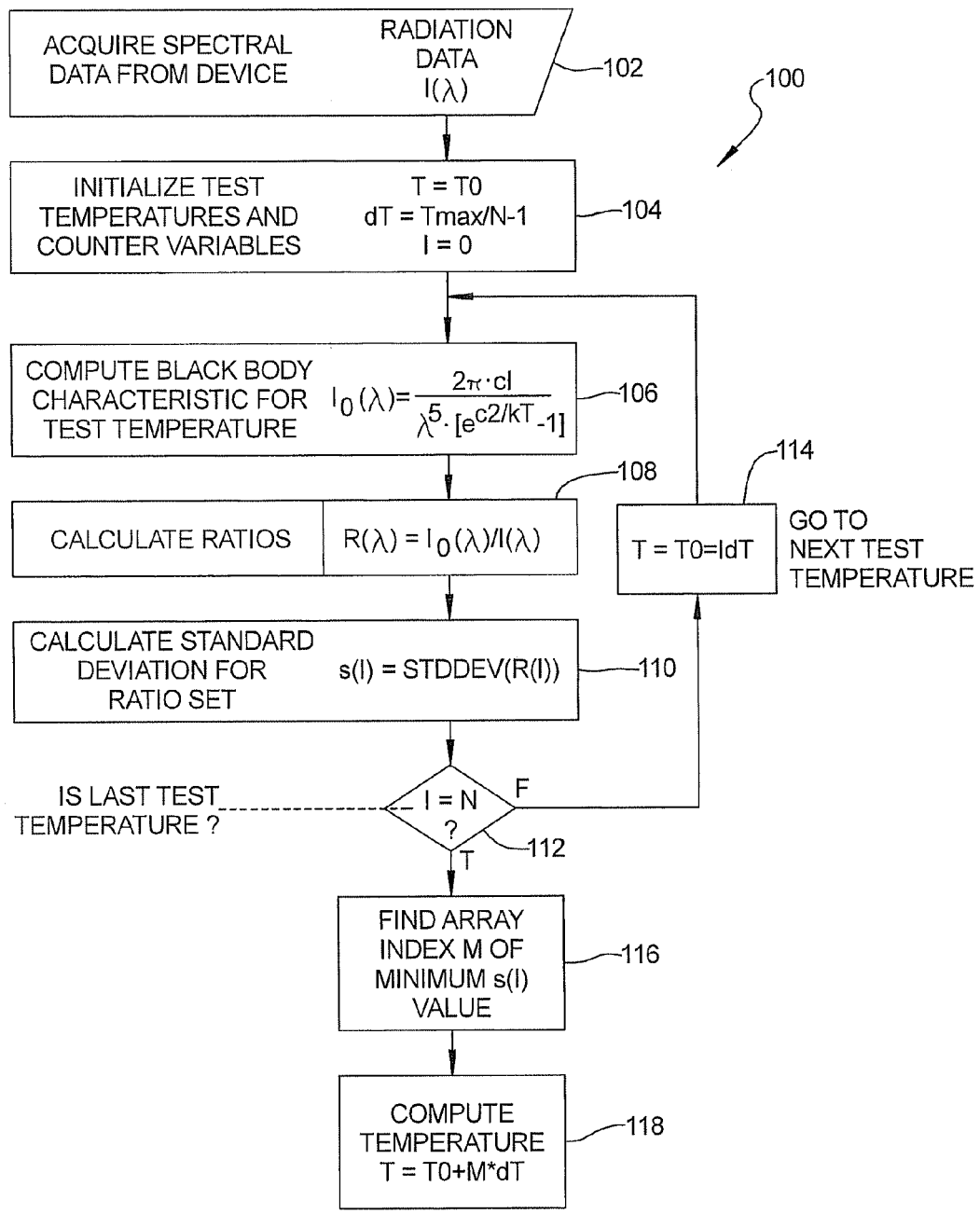
FIG. 5 is a flowchart illustrating operations performed by the apparatus of FIG. 2, and more particularly the operations performed by the processor of FIG. 2 using an algorithm, that enables the processor to analyze the spectral data collected against the test temperatures.

With the foregoing overview of the algorithm 40, reference will now be made to FIG. 5 for a more detailed discussion of the sequence of operations performed by the algorithm. Referring to the flowchart 100 of FIG. 5, which represents the operations of one implementation of the algorithm 40, at operation 102 the spectral radiation data from the object 16 is obtained using the apparatus 10 shown in FIG. 1. More specifically, the output 36 from the linear array detector 34 is obtained by the processor 38, which represents a set of spectral data taken at the different wavelengths of the individual detector segments $34_1$-$34_n$ of the detector. At operation 104, the test temperatures and a counter are initialized. The term "T=T0" indicates that the initial test temperature is set equal to zero. The term dT=Tmax/N−1 indicates that first test temperature used will be the maximum (highest) test temperature divided by "N−1", where "N" is the total number of test temperatures to be used by the algorithm 40. The term "I=0" sets a counter to zero.

At operation 106, the characteristic of an ideal black body, at a given wavelength, is calculated for the first test temperature. At operation 108, the algorithm 40 calculates a set of ratios for the first test temperature. This set of ratios is formed by using the outputs from the various segments $34_1$-$34_n$ of the detector 34, along with the characteristic calculated for the ideal black body (for example radiance) at the selected test temperature. Thus, this initial set of ratios is uniquely identified with the initial test temperature.

At operation 110, the standard deviation for the ratios just calculated at operation 108 is determined. A check is then made if the just used test temperature is the last temperature to be used, as indicated at operation 112, and if not, then the next test temperature is obtained as indicated at operation 114 and operations 106-112 are repeated. For example, the first test temperature used may be 300° C., the next one may be 400° C., and so forth.

Each cycle through operations 106-114 creates a set of ratios, with an associated standard deviation, that are both uniquely associated with a specific test temperature. Thus, the repeating of operations 106-114 creates an array of standard deviations, with each standard deviation being uniquely associated with a specific set of ratios, which in turn relate to only one of the test temperatures. Each standard deviation essentially represents the variation of the spectral data from the characteristic of the black body at a specific test temperature.

When the check at operation 112 indicates that there are no additional test temperatures to use, then the array of standard deviations is searched to determine the minimum standard deviation, as indicated at operation 116. The minimum standard deviation identifies the set of ratios, for a specific test temperature, that deviate the least from the characteristic of the black body at the same test temperature. At operation 118, the minimum standard deviation is used together with the minimum test temperature to compute the temperature of the object 16 (FIG. 1). The array index, "M", is determined from the set of standard deviations as follows. M is assigned to the index of the first element, i.e. M=1. Each element in the array of standard deviations, beginning with the first, is compared with the previous element. If that element is less than the previous element, then the array index of the lesser element is assigned to M. This process is repeated until all the indices are exhausted. The resulting value for M is the index of the minimum standard deviation element.

Figure 6:
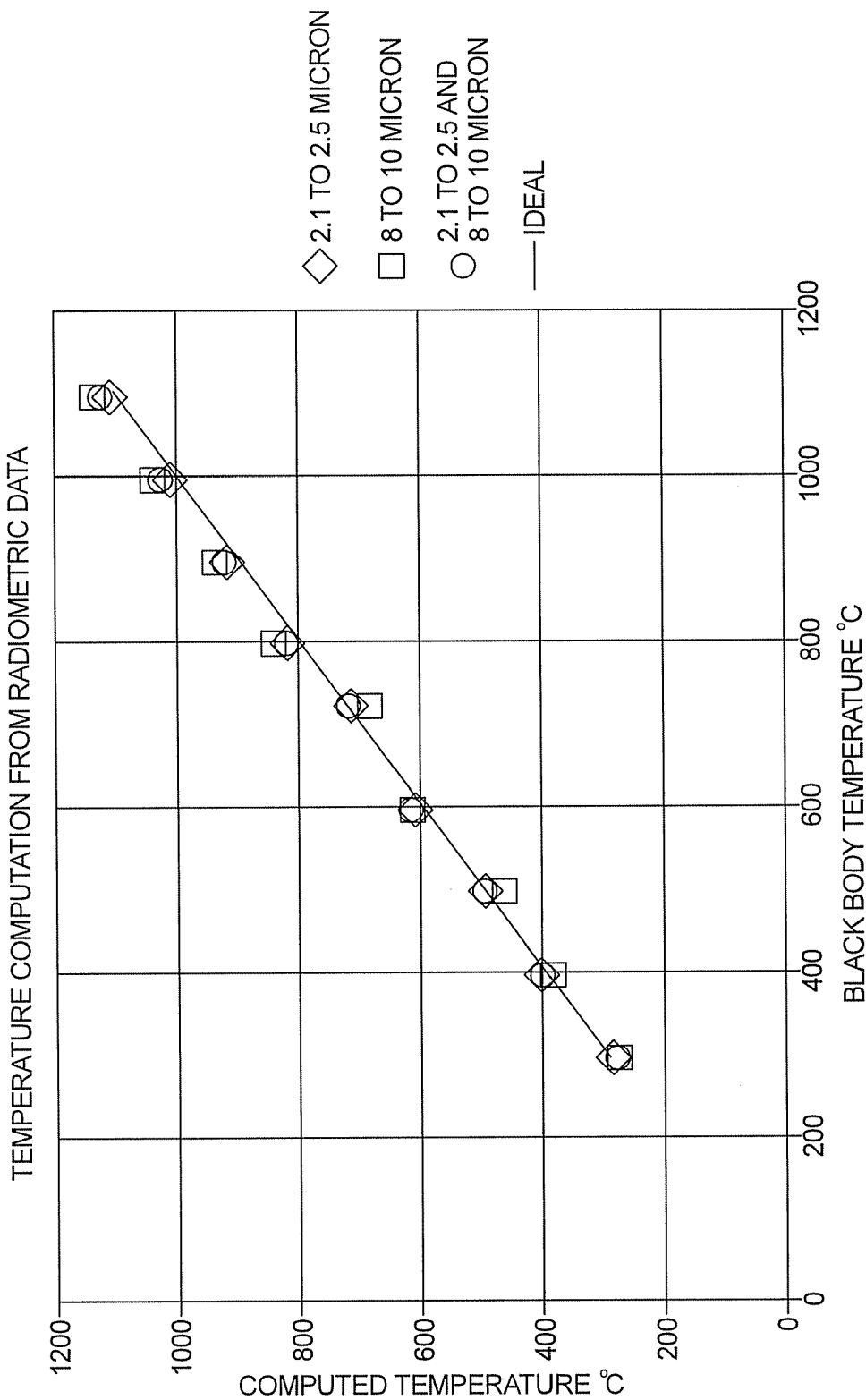
FIG. 6 is graph illustrating test results showing the accuracy of the apparatus and method in computing the temperature of a black body object.

Referring briefly to FIG. 6, a comparison of a computed temperature of a black body to its ideal temperature, using the apparatus 10 and methodology described herein, is shown. The In this example it can be seen that the computed temperatures at each of the frequency spectra 2.1-2.5 microns, 8-10 microns, and 2.1-2.5 and 8-10 microns all closely track the "ideal" (i.e., actual) temperature of the black body.

The apparatus 10 and method of the present disclosure may be used to measure the temperature of an object over a wide temperature range, and over 1200° C. The apparatus 10 is relatively compact, does not require an active laser source, and is able to operate on a broad range of materials that do not exhibit strong wavelength dependent surface emissivity. Moreover, the apparatus 10 does not require a mechanical light chopper, and performs its temperature measurement without the need to make physical contact with the object being measured. Still further, the linear array detector 34 may be operated without the need for active cooling.

A particular advantage of the system and method of the present disclosure is that by using known characteristics of a black body, in connection with the analysis of the ratios obtained, the emissivity of the object becomes immaterial to the determination of its actual temperature. Put differently, the present system and method does not require advance knowledge of the emissivity of the object being measured, nor is the outcome of the measurement determination made by the present system and method affected by the emissivity of the object being measured.

While various embodiments have been described, those skilled in the art will recognize modifications or variations which might be made without departing from the present disclosure. The examples illustrate the various embodiments and are not intended to limit the present disclosure. Therefore, the description and claims should be interpreted liberally with only such limitation as is necessary in view of the pertinent prior art.

What is claimed is:

1. An apparatus for determining a temperature of an object without contacting said object, the apparatus comprising:
   an etalon filter for receiving spectral radiation of the object over a plurality of wavelengths and generating a spectral output signal;
   a linear array detector responsive to said spectral output signal from said etalon filter and adapted to generate an output indicative of said spectral radiation at each of one of said plurality of wavelengths;
   an actuator for controlling movement of one element of said etalon filter to sweep said spectral output signal across said linear array detector, to assist in generating said output; and
   a processor responsive to said output of said linear array detector and adapted to analyze a known characteristic of a black body at a plurality of test temperatures, against said output of said linear array detector, to determine a specific temperature of said object.

2. The apparatus of claim 1, wherein said etalon filter comprises a Fabry-Perot filter, and wherein said Fabry-Perot filter comprises a substrate having an element forming a linear variable filter.

3. The apparatus of claim 2, wherein said substrate comprises a surface coating forming a broad band reflective coating on a side thereof that faces said object, and wherein said linear variable filter is formed on an opposite surface of said substrate.

4. The apparatus of claim 1, wherein said processor comprises an algorithm that enables said processor to determine a set of ratios of said output relative to said characteristic of said black body, for each one of said test temperatures.

5. The apparatus of claim 4, wherein said processor is adapted to execute said algorithm to determine a standard deviation for each said set of ratios, and to use said standard deviations and said characteristic of said black body at each of said test temperatures to determine an actual temperature of said black body.

6. The apparatus of claim 5, wherein said processor is configured to execute said algorithm to determine a minimum one of said standard deviations, and to use said minimum one of said standard deviations to identify a specific one of said test temperatures as being closest to an actual temperature of said object.

7. The apparatus of claim 6, wherein said processor further is adapted to use said minimum one of said standard deviations, and said specific one of said test temperatures, to calculate an actual temperature of said object.

8. An apparatus for determining a temperature of an object without contacting said object, the apparatus comprising:
   an etalon filter for receiving spectral radiation of the object over a plurality of wavelengths and generating a spectral output signal;
   a linear array detector responsive to said spectral output signal from said etalon filter and adapted to generate an output indicative of said spectral radiation at each of one of said plurality of wavelengths;
   an actuator for controlling movement of one element of said etalon filter to assist in generating said output; and
   a processor responsive to said output of said linear array detector and adapted to analyze a known characteristic of a black body at a plurality of test temperatures, against said output of said linear array detector, to determine a specific temperature of said object, said processor including an algorithm that enables said processor to determine a set of ratios of said output relative to said characteristic of said black body, for each one of said test temperatures.

9. The apparatus of claim 8, wherein said processor is adapted to execute said algorithm to determine a standard deviation for each said set of ratios.

10. The apparatus of claim 9, wherein said processor is adapted to use said standard deviations and said characteristic of said black body at each of said test temperatures to determine an actual temperature of said black body.

11. The apparatus of claim 10, wherein said processor is configured to execute said algorithm to determine a minimum one of said standard deviations, and to use said minimum one of said standard deviations to identify a specific one of said test temperatures as being closest to an actual temperature of said object.

12. The apparatus of claim 11, wherein said processor further is adapted to use said minimum one of said standard deviations, and said specific one of said test temperatures, to calculate an actual temperature of said object.

13. The apparatus of claim 12, wherein said etalon filter comprises a Fabry-Perot filter, and wherein said Fabry-Perot filter comprises a substrate having an element forming a linear variable filter.

14. The apparatus of claim 13, wherein said substrate comprises a surface coating forming a broad band reflective coating on a side thereof that faces said object.

15. The apparatus of claim 14, wherein said linear variable filter is formed on an opposite surface of said substrate.

16. An apparatus for determining a temperature of an object without contacting said object, the apparatus comprising:
   an etalon filter for receiving spectral radiation of the object over a plurality of wavelengths and generating a spectral output signal;
   a linear array detector responsive to said spectral output signal from said etalon filter and adapted to generate an output indicative of said spectral radiation at each of one of said plurality of wavelengths;
   an actuator for controlling movement of one element of said etalon filter to assist in generating said output; and
   a processor responsive to said output of said linear array detector and adapted to analyze a known characteristic of a black body at a plurality of test temperatures, against said output of said linear array detector, to determine a specific temperature of said object, said processor including an algorithm that enables said processor to determine a set of ratios of said output relative to said characteristic of said black body, for each one of said test temperatures; and wherein said processor is adapted to execute said algorithm to determine a standard deviation for each said set of ratios; and wherein said processor is adapted to use said standard deviations and said characteristic of said black body at each of said test temperatures to determine an actual temperature of said black body.

17. The apparatus of claim 16, wherein said processor is configured to execute said algorithm to determine a minimum one of said standard deviations, and to use said minimum one of said standard deviations to identify a specific one of said test temperatures as being closest to an actual temperature of said object.

18. The apparatus of claim 17, wherein said processor further is adapted to use said minimum one of said standard deviations, and said specific one of said test temperatures, to calculate an actual temperature of said object.

19. The apparatus of claim 18, wherein said etalon filter comprises a Fabry-Perot filter, and wherein said Fabry-Perot filter comprises a substrate having an element forming a linear variable filter.

20. The apparatus of claim 19, wherein said substrate comprises a surface coating forming a broad band reflective coating on a side thereof that faces said object.

* * * * *